US007006850B1

(12) United States Patent
James et al.

(10) Patent No.: US 7,006,850 B1
(45) Date of Patent: Feb. 28, 2006

(54) SYSTEMS, APPARATUS, AND METHODS FOR COCKPIT INTERFACE SYSTEM WITH DIGITAL AUDIO RADIO MANAGEMENT UNIT

(75) Inventors: Timothy James, Olathe, KS (US); Timothy Johnson, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 567 days.

(21) Appl. No.: 10/099,441

(22) Filed: Mar. 15, 2002

(51) Int. Cl.
*H04Q 7/32* (2006.01)

(52) U.S. Cl. .................. 455/569.1; 455/431; 455/403; 455/569.2; 455/550.1; 455/90.3; 455/422.1; 455/500; 701/3; 701/24; 701/29; 434/29; 340/935; 340/951

(58) Field of Classification Search ................ 455/431, 455/403, 422.1, 569.1, 569.2, 550.1, 466, 455/556.1, 557, 515.1, 3.06, 423, 424, 425, 455/426.1, 426.2, 500, 517, 24, 507, 508, 455/66.1, 73, 74, 575.1, 90.3; 701/3, 29, 701/33, 16, 213; 340/945, 951; 434/29
See application file for complete search history.

(56) References Cited

U.S. PATENT DOCUMENTS

| 4,107,459 A | * | 8/1978 | Stamper ..................... 375/368 |
| 4,519,069 A | * | 5/1985 | Pudsey ...................... 370/439 |
| 5,396,651 A | * | 3/1995 | Nitardy ...................... 455/517 |
| 5,774,796 A | * | 6/1998 | Sherwood ................ 455/115.1 |
| 6,377,188 B1 | * | 4/2002 | Maruyama ............. 340/825.69 |
| 6,697,336 B1 | * | 2/2004 | Socher ....................... 370/252 |
| 2003/0054817 A1 | * | 3/2003 | Goldberg et al. ........... 455/431 |

* cited by examiner

*Primary Examiner*—Keith Ferguson
(74) *Attorney, Agent, or Firm*—David L. Terrell

(57) ABSTRACT

Communication devices, such as a radio and a cockpit communication panel, digitally communicate audio signals as digital data without use of a synchronizing clock signal between the devices. The communication panel and the radio function as both a receiver and as a transmitter of digital audio signals. In one embodiment, an analog audio signal is received by the transmitting device and transformed by a coder/decoder (CODEC) into a plurality of signals. The plurality of signals is received and transformed by a field programmable gate array (FPGA) into a digital signal that includes framing pulse and stop bits. The digital signal is transmitted to a FPGA in a receiving device, which transforms the signal into a second plurality of signals. A CODEC in the receiving device transforms the second plurality of signals into an analog audio signal.

15 Claims, 5 Drawing Sheets

SYSTEMS, APPARATUS, AND METHODS FOR COCKPIT INTERFACE SYSTEM WITH DIGITAL AUDIO RADIO MANAGEMENT UNIT

FIELD OF THE INVENTION

The present invention relates generally to avionic cockpit communication devices, and in particular to communication of audio signals between avionic cockpit communication devices.

BACKGROUND OF THE INVENTION

Avionic communication devices are well known in the field of aviation electronic (avionic) instruments. The method and apparatus of communication between communication devices implemented by known prior art systems depends on the capabilities of system resources, such as communications paths between the devices. As increased system capability also generally increases system cost, the method of communication implemented by communication devices is a function of overall system cost.

One feature of increased system capability cost involves the communication of audio information between a communication panel and a radio. One example of a radio is a very-high frequency (VHF) receiver/transmitter.

Airplane cockpits have high levels of noise. The noise interferes with, and reduces, the effectiveness of audio communications in the cockpit. Headsets are often used to counteract high levels of noise in an airplane cockpit. Audio communication includes conversation between members of the flight crew, listening to radio flight communications, and speaking into microphones for radio flight transmissions. Often, at least one member of the flight crew wears a headset that includes headphones and microphones for audio communication. The headset is operably coupled to a communication panel. The communication panel is mounted on a cockpit instrument panel in the cockpit. The communication panel is operably coupled to a radio through an entirely analog communication path. The radio allows communication with ground stations and other aircraft.

Electromagnetic disturbances often interfere with analog radio communication. The communication of audio information between the radio and the communication panel is analog. Furthermore, the communication of audio information between the communication panel and the headset is analog. Analog communication is interfered by external electromagnetic disturbances. Electromagnetic disturbances are caused by a number of sources, such as ignition in an airplane engine, and the operation of an electromechanical device in the airplane, such as a servo, an air-conditioner compressor, or an autopilot device. To make matters worse, these sources are typically located within a few feet of the analog communication path, which increases the strength of the electromagnetic disturbance in the analog communication path. The communication path is typically comprised of two lines, one line for each direction of communication.

Furthermore, the extent or degree of electromagnetic disturbance in the analog line between the radio and the communication panel is in the order of 14 or even 28 volts. In contrast, the electrical potential in the electromechanical devices is 0.50 volts. Thus, the magnitude of the electrical disturbance of the electro-mechanical devices and the analog line can therefore be up to 56 times the voltage in the analog line. This high magnitude can overwhelm an analog signal in the analog line.

In order to reduce the electromagnetic interference, expensive wiring is implemented as the analog communication lines. Conventionally, a twisted shield pair is implemented as the analog communication lines, in which two lines are combined into one line. The twisted shielded wiring typically costs between $50 and $100 for each line, yielding a total cost for the two lines of at least $100, if not $200.

In summary, conventional avionic systems communicate analog audio signals between a communication panel and a radio through two relatively costly twisted shielded cables. Therefore, there exists a need for systems, methods, and apparatus adapted to communicate audio signals between a communication panel and radio through less expensive cabling that provides protection from electromagnetic disturbances.

SUMMARY OF THE INVENTION

The above mentioned problems of avionic audio communication devices are addressed by the present invention and will be understood by reading and studying the following specification. Systems and methods are provided to allow a digital communication path between a communication panel and a radio in an aircraft avionic system without use of a synchronizing clock signal between the radio and the communication panel. The systems and methods of the present invention offer an improved audio communication path between a communication panel and a radio in an aircraft avionic system which includes a digital communication path, which in turn, more accurately, efficiently, and understandably improves communication between audio devices in aircraft.

In one embodiment, the digital communication path includes two unidirectional digital communication lines. The radio and the communication panel both include an analog-to-digital (A/D) converter and a digital-to-analog (D/A) converter operably coupled to each of two termination points of the unidirectional digital communication lines.

In one embodiment of the A/D converters and the D/A converters, a coder/decoder (CODEC) device is operably coupled to an analog audio communication path. Each CODEC device is operably coupled to a clock that provides synchronization. Each CODEC device is operably coupled to three communication paths, a first path provides bit clock communication, a second path provides synchronized communication, and a third path provides data communication. The bit clock defines bit framing for digital data. The synchronized communication also functions as a clock, as it provides word framing for digital communication. Each of the three communication paths are operably coupled to a dynamically reconfigurable processor, such as a field programmable gate array (FPGA). One functional equivalent to each FPGA is a digital signal processor (DSP) microprocessor. Another functional equivalent to each FPGA is a programmable logic device (PLD).

The present invention has the advantage of using digital communications between two audio communication devices in an aircraft cockpit. Using digital communications between communication devices in an aircraft cockpit reduces interference from electromagnetic disturbances because of the use of larger digital logic voltages, and uses less expensive cabling, in comparison to the prior art of using analog communications.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to aircraft avionic devices, systems and apparatus having improved communication and/or exchange of audio information, which in turn, more accurately, efficiently, and understandably improves communication between audio devices in aircraft. One type of avionic device is a radio. Such devices are known and have a variety of uses. Another type of avionic device is a communication panel. A communication panel includes at least one female jack to receive a male jack of a headset.

Figure 1:
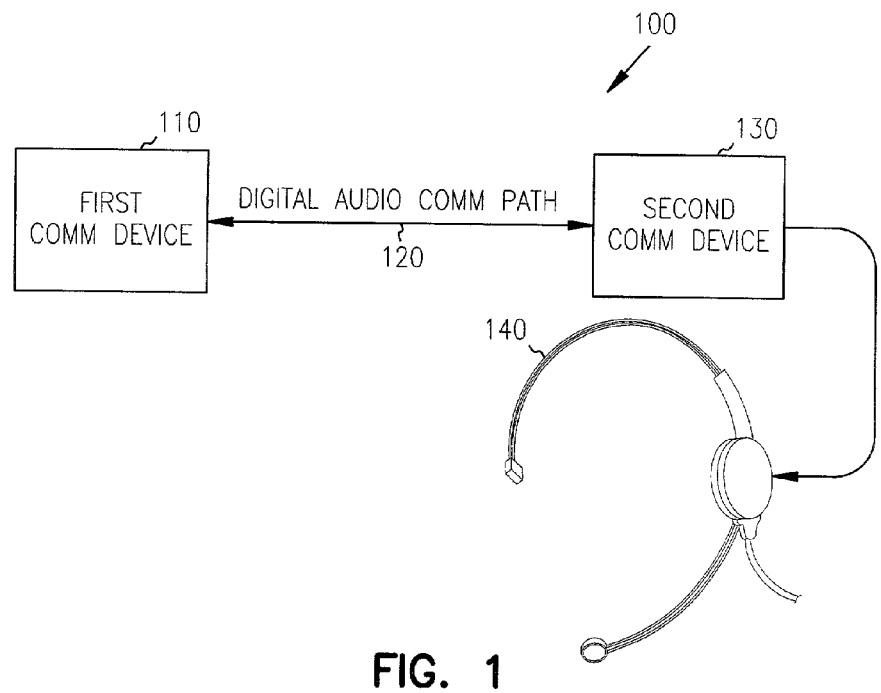
FIG. 1 illustrates an example of an avionic system according to the teachings of the present invention.

FIG. 1 illustrates an example of an avionic system 100 according to the teachings of the present invention. It is readily appreciated that the data and labels presented within system 100 are presented by way of illustration only. In one embodiment, avionic system 100 performs method 500 in FIG. 5.

The system 100 includes a first audio communication device 110. The system 100 also includes a digital audio communication path 120. In some embodiments, the digital audio communication path 120 includes a bidirectional digital audio communication path. In some embodiments, the digital audio communication path 120 includes two unidirectional digital audio communication lines. The digital audio communication path 120 is operably coupled to the first audio communication device 110.

The system 100 also includes a second communication device 130. The second communication device 130 is operably coupled to the digital audio communication path 120. The digital audio communication path 120 between audio communication devices 110 and 130 in an aircraft cockpit is less susceptible to interference from electromagnetic disturbances than conventional analog communication paths. Thus the digital audio communication path 120 provides a clearer signal than in conventional systems. Also, the digital audio communication path 120 can use cabling that is less shielded and thus less expensive than a conventional communication path. Thus the digital audio communication path 120 is less expensive than in conventional systems.

In one example, one of the communication devices, such as the first audio communication device 110 includes a radio. One example of a radio that is common in aircraft is a very-high frequency (VHF) receiver/transmitter. In one example, one of the communication devices, such as the second communication device 130 includes a communication panel. The communication panel 130 has an operable interface capable of communicating an analog audio signal with a headset 140.

In one embodiment, the first audio communication device 110 and/or the second communication device 130 each include an analog-to-digital (A/D) converter. One embodiment of the A/D converter is shown below in FIG. 3A. The A/D converter is operably coupled to the digital audio communication path 120. The A/D converter is also operably coupled to an analog audio communication path within the respective communication device.

Figure 2:
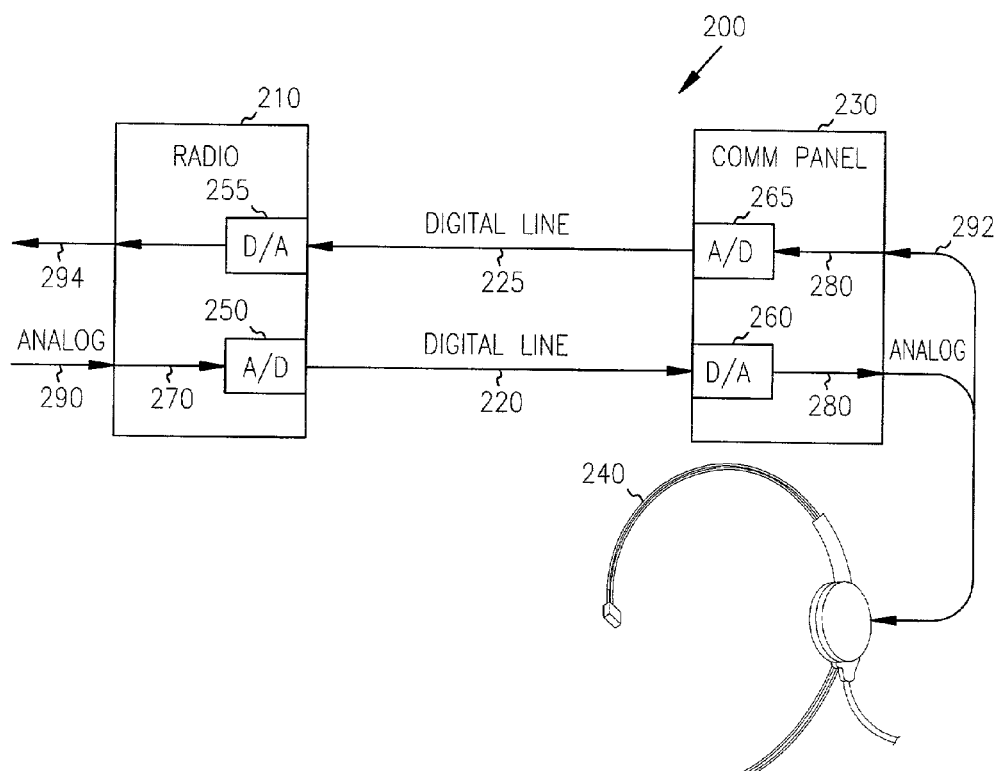
FIG. 2 illustrates an example of an avionic system including a radio and a communication panel that both include an A/D converter and a D/A converter to operably couple to a digital audio communication path, according to the teachings of the present invention.

FIG. 2 illustrates an example of an avionic system 200 including a radio and a communication panel that both include an A/D converter and a D/A converter to operably couple the radio and the communication panel through digital lines, according to the teachings of the present invention. It is readily appreciated that the data and labels presented within system 200 are presented by way of illustration only. In one embodiment, avionic system 200 performs method 500 in FIG. 5.

The system 200 includes a radio 210. The system 200 also includes a communication panel 230. The communication panel 230 is operably coupled to the radio 210 through digital audio communication lines 220 and 225. The digital audio communication lines 220 and 225 between the radio 210 and the communication panel 230 in an aircraft cockpit are less susceptible to interference from electromagnetic disturbances than analog communication paths in conventional systems. As a result, the digital audio communication lines 220 and 225 use cabling that is less shielded than a conventional analog communication path, and thus the digital audio communication lines 220 and 225 use less expensive cabling than a conventional analog communication path.

In one example of the radio 210, the radio 210 is a very-high frequency (VHF) receiver/transmitter. The communication panel 230 has an operable interface capable of communicating an analog audio signal with a headset 240.

Both the radio 210 and the communication panel 230 include an analog-to-digital (A/D) converter, 250 and 265, respectively. Embodiment of the A/D converter is shown below in FIG. 3A. The A/D converters 250 and 265 are operably coupled to the digital audio communication lines 220 and 225, respectively. A/D converter 250 converts analog audio signals from the analog audio communication path 290 to digital audio signals for transmission over the digital audio communication line 220. A/D converter 265 converts analog audio signals from the analog audio communication path 292 to digital audio signals for transmission over the digital audio communication line 225. In one embodiment, either A/D converter 250 or 265 performs method 600 in FIG. 6.

Both the radio 210 and the communication panel 230 include a digital-to-analog (D/A) converter, 255 and 260, respectively. One embodiment of the D/A converter is shown below in FIG. 3B. The D/A converters 255 and 260 are operably coupled to the digital audio communication lines 225 and 220, respectively. D/A converter 255 converts digital audio signals from the digital communication path 225 to analog audio signals for transmission over the analog audio communication line 294. D/A converter 260 converts digital audio signals from the digital audio communication line 220 to analog audio signals for transmission over analog audio communication line 280. In one embodiment, either D/A converter 255 or 260 performs method 700 in FIG. 7.

Figure 3A:
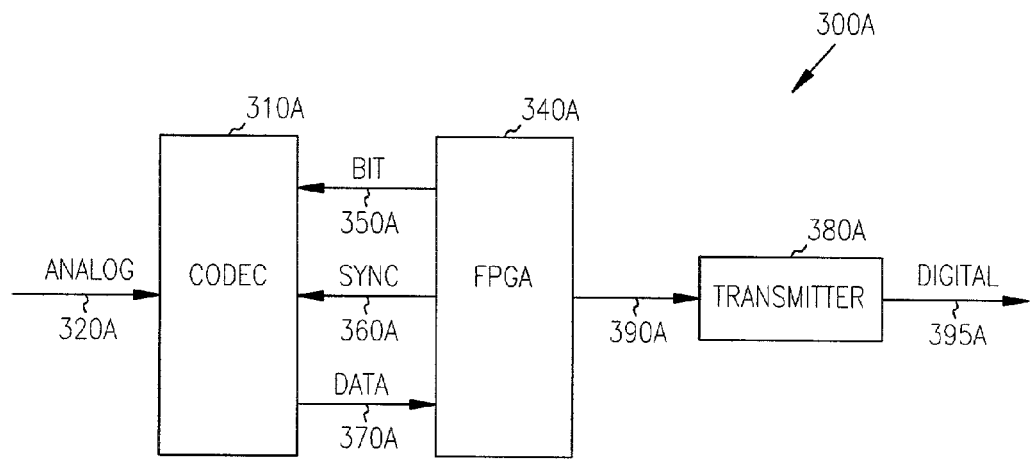
FIG. 3A illustrates an example of one analog-to-digital converter according to the teachings of the present invention.

FIG. 3A illustrates an example of one analog-to-digital (A/D) converter 300A according to the teachings of the present invention. It is readily appreciated that the data and labels presented within A/D converter 300A are presented by way of illustration only. In one embodiment, the A/D converter 300A performs the method 600 in FIG. 6.

In one embodiment of FIG. 3A, the A/D converter 300A is included in the first audio communication device 110 in FIG. 1 and/or the second communication device 130 in FIG. 1. In that embodiment, the A/D converter operably couples an analog communication path in the respective communication device to a digital audio communication path, such as 120 in FIG. 1.

According to teachings of the present invention, the A/D converter 300A includes a coder/decoder (CODEC) 310A. The CODEC 310A is operably coupled to an analog communication path 320A within the respective communication device (e.g. 110 and 130 in FIG. 1).

As shown in FIG. 3A, the A/D converter 300A also includes a field programmable gate array (FPGA) 340A. According to teachings of the present invention, the FPGA 340A is operably coupled to the CODEC 310A through three communication paths. In one master-slave embodiment, the A/D converter 300A functions as A/D converter 265 in FIG. 2.

In one embodiment, the three communication paths include a first path 350A, a second path 360A, and a third path 370A. The first path 350A is adapted to provide, facilitate and/or allow bit clock communication 350A. The second path 360A is adapted to provide, facilitate and/or allow synchronized communication 360A. The third path 370A is adapted to provide, facilitate and/or allow data communication 370A. As one of ordinary skill in the art will appreciate, the three communication paths can be embodied in one of a number of line types, such as copper wire, fiber optic cable, printed circuit board (PCB) traces, and/or coaxial cable.

Figure 3B:
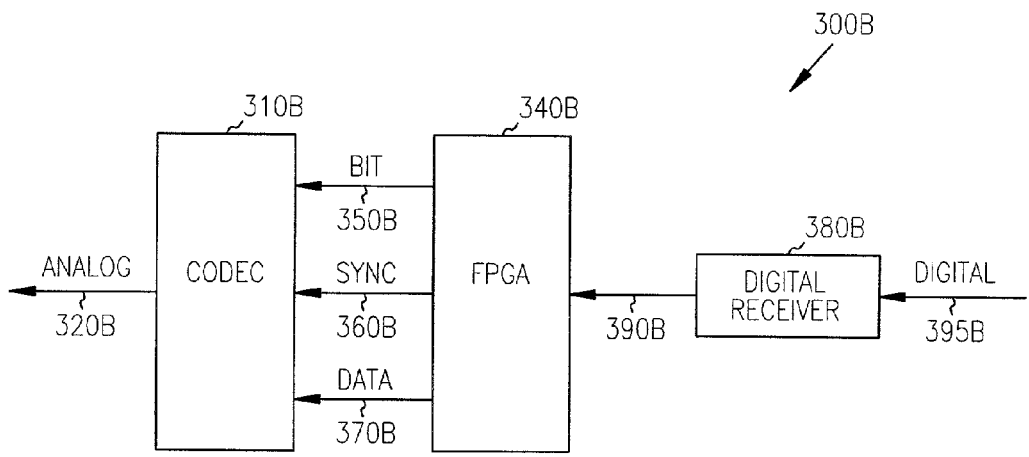
FIG. 3B illustrates an example of one digital-to-analog converter according to the teachings of the present invention.

Data from the bit clock path 350A, the synchronization path 360A, and the data path 370A are combined by the FPGA 340A in such a manner that a decoding FPGA, such as FPGA 340B in FIG. 3B can decode the combined digital signal without reference to a separate synchronizing clock signal. In one embodiment of the combining, the digital audio signal is synchronized by a series of synchronization bits. In one embodiment of the synchronization bits, the synchronization bits include a plurality of stop bits followed by a framing pulse.

As shown in FIG. 3A, the A/D converter 300A also includes a transmitter 380A. The transmitter is operably coupled to the FPGA 340A through a communication path 390A. According to teachings of the present invention, the transmitter is operably coupled to a digital audio communication path 395A.

FIG. 3B illustrates an example of one digital-to-analog (D/A) converter 300B according to the teachings of the present invention. It is readily appreciated that the data and labels presented within D/A converter 300B are presented by way of illustration only. In one embodiment, the D/A converter 300B performs the method 700 in FIG. 7. In one master-slave embodiment, the D/A converter 300B functions as D/A converter 255 in FIG. 2.

In one embodiment of system 100 in FIG. 1, the first audio communication device 110 includes D/A converter 3001B. In one embodiment of system 100 in FIG. 1, the second communication device 130 includes D/A converter 300B. In those embodiments, the D/A converter operably couples an analog communication path in the respective communication device to a digital audio communication path, such as 120 in FIG. 1.

As shown in FIG. 3B, the D/A converter 300B includes a digital receiver 380B. The digital receiver is operably coupled to a field programmable gate array (FPGA) 340B through a communication path 390B. According to teachings of the present invention, the digital receiver 380B is operably coupled to a digital audio communication path 395B.

The FPGA 340B is operably coupled to a coder/decoder (CODEC) 310B through three communication paths. In one embodiment, the three communication paths include a first path 350B, a second path 360B, and a third path 370B. The first path is adapted to provide, facilitate and/or allow bit clock communication 350B. The second path is adapted to provide, facilitate and/or allow synchronized communication 360B. The third path is adapted to provide, facilitate and/or allow data communication 370B. As one of ordinary skill in the art will appreciate, the three communication paths can be embodied in one of a number of line types, such as copper wire, fiber optic cable, PCB coaxial cable. FPGA 340B decodes the digital signal without reference to a separate synchronizing clock signal because bit clock signals, synchronization signals, and the data signals are combined into the digital signal that allow for decoding without a separate synchronizing clock signal.

The CODEC 310B is operably coupled to an analog communication path 320B within the respective communication device (e.g. 110 and 130 in FIG. 1).

Figure 4:
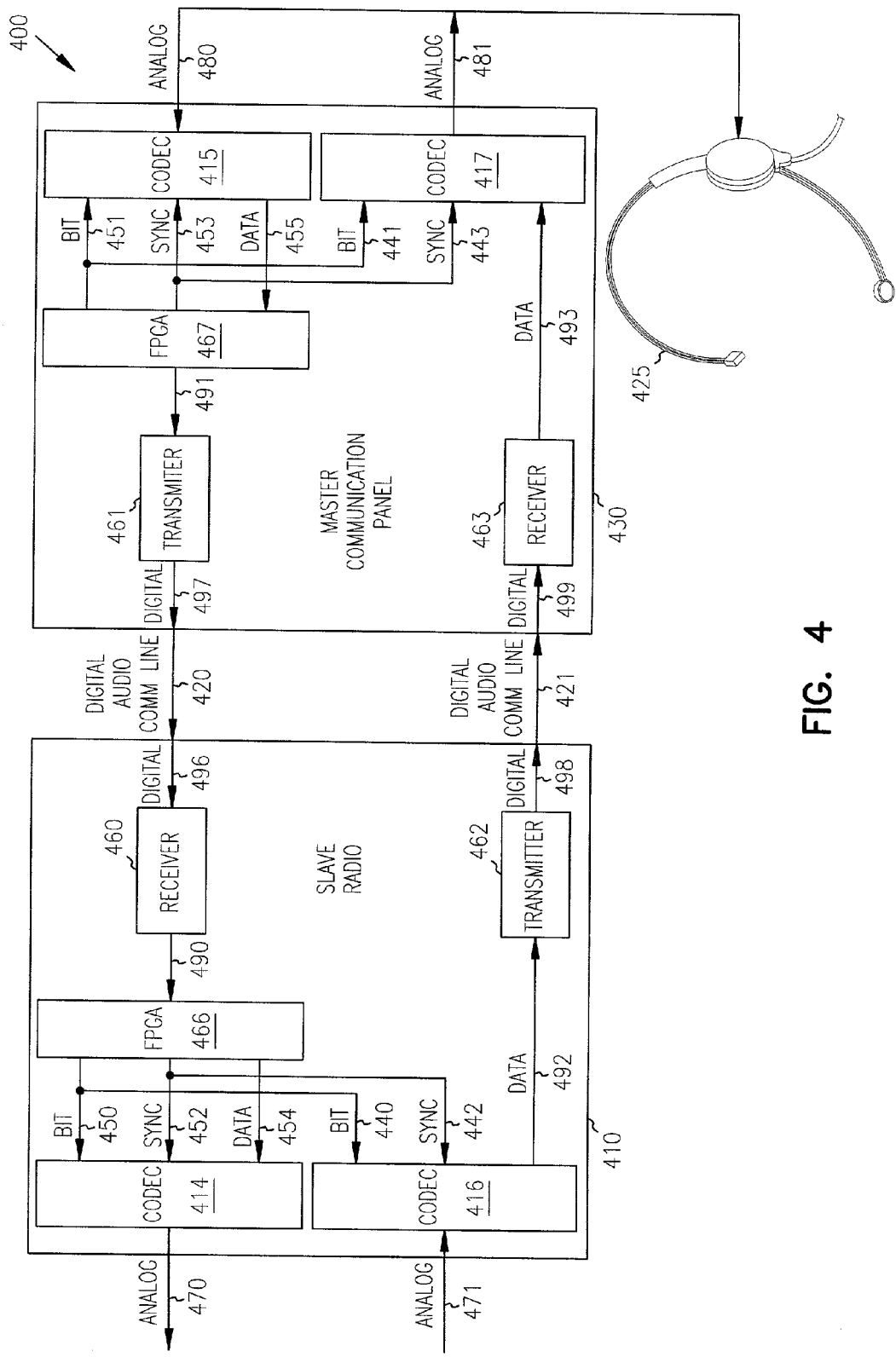
FIG. 4 illustrates an example of an avionic system including a master communication panel and a slave radio operably coupled via a digital audio communication path, according to the teachings of the present invention.

FIG. 4 illustrates an example of an avionic system including a master communication panel and a slave radio operably coupled via a digital audio communication path, according to the teachings of the present invention. It is readily appreciated that the data and labels presented within system 400 are presented by way of illustration only.

The system 400 includes a radio 410. The system 400 also includes a communication panel 430. In one master-slave embodiment, the communication panel 430 functions as a master and the radio 410 functions as a slave. As one of ordinary skill in the art will understand, upon reading and comprehending this disclosure, the signal processing for transmitting signals from the slave radio 410 to the master communication panel 430 is simpler and less demanding on resources than the signal processing from the master communication panel 430 to the slave radio 410. One of ordinary skill in the art will further understand, upon reading and comprehending this disclosure, that additional communication device slaves are capable of being added to the avionic system.

The communication panel 430 is operably coupled to the radio 410 through digital audio communication lines 420 and 421. The digital audio communication lines 420 and 421 between the radio 410 and the communication path 430 in an aircraft cockpit are less susceptible to interference from electromagnetic disturbances than conventional systems. As a result, the digital audio communication lines 420 and 421 use cabling that is less shielded than a conventional communication path, and thus the digital audio communication lines 420 and 421 use less expensive cabling.

In one example of the radio 410, the radio 410 is a very-high frequency (VHF) receiver/transmitter. The communication panel 430 has an operable interface capable of communicating an analog audio signal with a headset 425.

The radio 410 and the communication panel 430 both include a coder/decoder (CODEC) 414 and 415, respectively. CODECs 414 and 415 are operably coupled to an analog communication path, 470 and 480, respectively, within the respective communication device.

The radio 410 and the communication panel 430 both include a coder/decoder (CODEC) 416 and 417, respectively. CODECs 416 and 417 are operably coupled to an analog communication path, 471 and 481, respectively, within the respective communication device.

The radio 410 also includes a field programmable gate array (FPGA) 466 in one embodiment or a programmable logic device (PLD) in another embodiment. The communication panel 430 also includes field programmable gate array (FPGA) 467. The FPGAs 466, and 467 are operably coupled to CODECs, 414, 415, 416 and 417 through communication paths.

In one embodiment, the communication paths include a path that provides bit clock communication 450, 451, 440, and 441, respectively, and a path that provides synchronized communication 452, 453, 442, and 443, respectively. A path that provides data communication 454 and 455 is operably coupled between the FPGA 466 and 467 and the CODEC 414 and 415, respectively. The radio 410 also includes a digital receiver 460 and digital transmitter 462. The communication panel 430 also includes a digital transmitter 461 and a digital receiver 463. A path that provides data communication 492 is operably coupled between the CODEC 416 and the transmitter 462. A path that provides data communication 493 is operably coupled between the receiver 463 and the CODEC 417.

The transmitter 461 is operably coupled to the FPGA 467 through a communication path 491. The CODEC 416 is operably coupled to the transmitter 462 to provide data communication. The transmitters 461 and 462 are operably coupled to digital audio communication paths 497 and 498, respectively.

The receiver 460 is operably coupled to the FPGA 466 through a communication path 490. The receiver 463 is operably coupled to the CODEC 417 to provide data communication. The receivers 460 and 463 are operably coupled to digital audio communication paths 496 and 499, respectively.

Thus, in the present invention, an analog signal is converted to a digital signal for transmission between audio communication device such as a radio 410 and a communication panel 430. As one of ordinary skill in the art will appreciate, the digital signal of the present invention is less susceptible to electromagnetic interference than an analog signal of conventional systems, and allows a less shielded, and thus a less expensive, cable to couple the audio communication devices.

In operation, from the headset 425 to the radio 410, an analog signal is transmitted from the headset 425 through line 480 to the CODEC 415 of the master communication panel 430. The CODEC 415 receives a bit clock signal 451 and a synchronization signal 453 from FPGA 467. In one embodiment, the bit clock signal 451 provides bit framing at a frequency of 125 KHz. In one embodiment, the synchronization signal 453 provides word framing using one bit for every eight bits. The CODEC 415 transforms the analog signal from line 480 into a digital data signal on line 455 using the bit clock signal 451 and the synchronization signal 453. The FPGA 467 bundles or transforms the bit signal, the synchronization signal, and the data signal into a digital signal sent on line 491 to transmitter 461. The transmitter 461 of the master communications panel 430 sends the digital signal to the receiver 460 of the slave radio 410 over line 420. The receiver 460 provides the signal to FPGA 466 on line 490. The FPGA 466 unbundles the signal to recover the bit clock signal 450, synchronization signal 452, and data signal 454. These signals are provided to the CODEC 414 to decode the signals into an analog signal on line 470.

From the radio 410 to the headset 425, an analog signal is received on line 471 by CODEC 416. In one Master-Slave embodiment, CODEC 416 receives bit clock signals 440 and synchronization signals 442 from the FPGA 466 which recovers these signals from the signals being sent by the master communication panel 430. In one non-master-slave embodiment, the radio 410 includes appropriate logic (e.g. FPGA) to provide a bit clock and synchronization signal as described above with respect to the communication panel 430, and to bundle or transform the bit clock and synchronization signal with the data signal for transmission to the communication panel. The CODEC 416 uses the bit clock and synchronization signals to provide digital data on line 492 to transmitter 462. Transmitter 462 sends a digital data signal over line 421 to the receiver 463 in the master communication panel 430, which in turn sends a data signal to CODEC 417 on line 493. In one master-slave embodiment, the CODEC 417 receives a bit clock signal 441 and a synchronization signal 443 from FPGA 467. In one non-master-slave embodiment, the communication panel 430 includes appropriate logic (e.g. FPGA) to recover a bit clock and synchronization signal from the signal transmitted from the radio 410. The CODEC 417 uses these signals to decode the signals into an analog signal to the headset 425 through line 481.

As one of ordinary skill in the art will understand upon reading and comprehending this disclosure, the communication devices are capable of being designed in a master-slave configuration as generally illustrated in FIG. 4, and are capable of being designed without a master-slave relationship. As one of ordinary skill in the art will understand upon reading and comprehending this disclosure, the electronic components shown in FIGS. 1–4 can be embodied as computer hardware circuitry or as a computer-readable program, or a combination of both.

Figure 5:
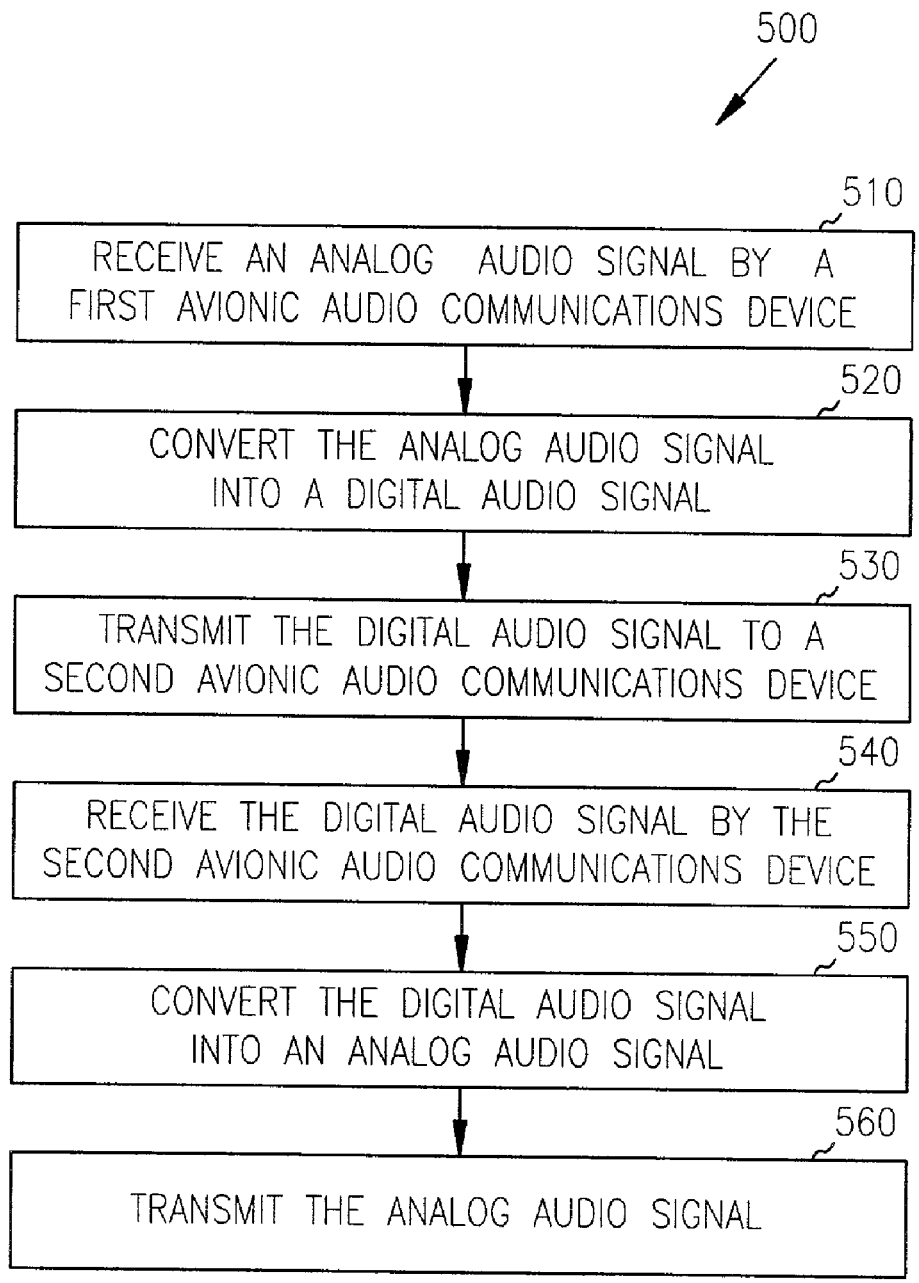
FIG. 5 is a flow diagram of a method of communicating audio signals between avionic audio communication devices, according to an embodiment of the present invention.

FIG. 5 is a flow diagram of a method 500 of communicating audio signals between avionic audio communication devices, using apparatus such as shown in the FIGS. 1, 2, 3A, 3B, and 4, according to an embodiment of the present invention.

According to teachings of the present invention, method 500 includes receiving an analog audio signal in block 510. The receiving in block 510 is performed by a first avionic audio communication device, such as either of the communication devices 110 and 130 in FIG. 1, and either the radio 210 and 410 or the communication panel 230 and 430 in FIGS. 2 and 4, respectively. In one embodiment the analog audio signal is analog signal 320A in FIG. 3A. In one embodiment the analog audio signal is analog signal 480 or 471 as shown in FIG. 4.

According to teachings of the present invention, method 500 also includes converting the analog audio signal into a digital audio signal, in block 520. The converting in block 520 is performed by the first avionic audio communication device. One embodiment of the converting in block 520 is converting a first analog audio signal into a digital audio signal in method 600 in FIG. 6. In one embodiment, converting 520 is performed by an A/D converter 250 or 265 in FIG. 2. In one embodiment, the digital audio signal is digital signal 390A in FIG. 3A. In one embodiment, the digital audio signal is digital signal 491 in FIG. 4. In one embodiment, the digital audio signal is digital signal 492 in FIG. 4.

According to teachings of the present invention, method 500 also includes transmitting the digital audio signal to a second avionic audio communication device, in block 530. The transmitting in block 530 is performed by the first avionic audio communication device. In one embodiment, the transmitting in block 530 is performed by transmitter 380A in FIG. 3A. In one embodiment, the transmitting in block 530 is performed by transmitter 461 in FIG. 4. In one embodiment, the transmitting in block 530 is performed by transmitter 462 in FIG. 4.

According to teachings of the present invention, method 500 also includes receiving the digital audio signal in block 540. The receiving in block 540 is performed by the second avionic audio communication device. In one embodiment, the receiving in block 540 is performed by receiver 380B in FIG. 3B. In one embodiment, the receiving in block 540 is performed by receiver 460 in FIG. 4. In one embodiment, the receiving in block 540 is performed by receiver 463 in FIG. 4.

According to teachings of the present invention, method 500 also includes converting the digital audio signal into an analog audio signal, in block 550. The converting in block 550 is performed by the second avionic audio communication device. One embodiment of the converting in block 550 is converting the digital audio signal into a second analog audio signal in method 700 in FIG. 7. In one embodiment, converting 550 is performed by D/A converters 255 or 260 in FIG. 2. In one embodiment, the analog audio signal is analog signal 320B in FIG. 3B. In one embodiment, the analog audio signal is analog signal 470 in FIG. 4. In one embodiment, the analog audio signal is analog signal 481 in FIG. 4.

According to teachings of the present invention, method 500 also includes transmitting the analog audio signal in block 560. The transmitting in block 560 is performed by the second avionic audio communication device.

Figure 6:
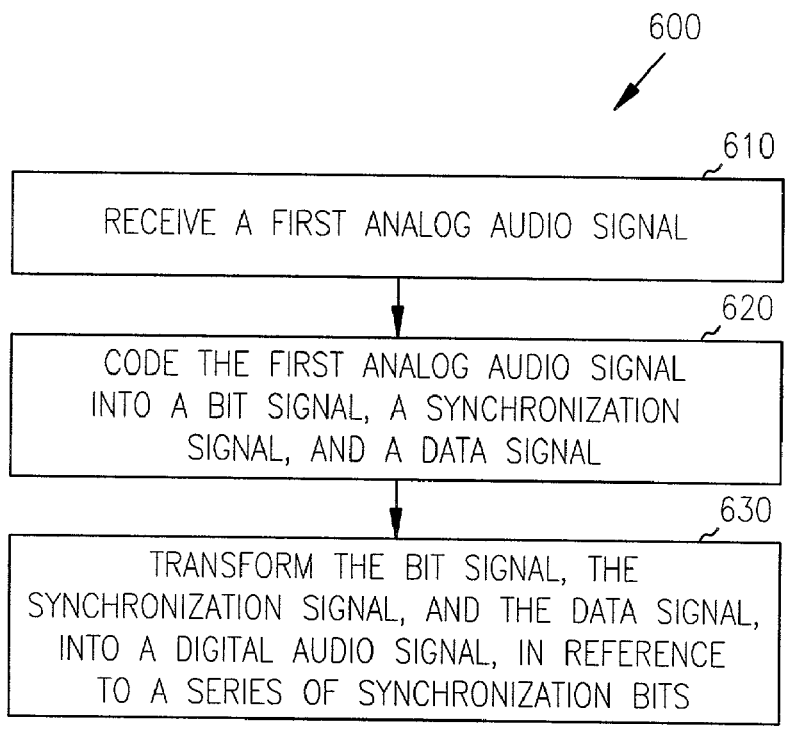
FIG. 6 is a flow diagram of a method of converting an analog audio signal into a digital audio signal, according to an embodiment of the present invention.

FIG. 6 is a flow diagram of a method 600 of converting a first analog audio signal into a digital audio signal, according to an embodiment of the present invention. Method 600 is one embodiment of converting a first analog audio signal into a digital audio signal, in block 520 in FIG. 5. In one embodiment, method 600 is performed by A/D converter 250 or 265 in FIG. 2.

According to teachings of the present invention, method 600 includes receiving the first analog audio signal, in block 610. According to teachings of the present invention, method 600 also includes coding the first analog audio signal into a bit clock signal, a synchronization signal, and a data signal, in block 620. In some embodiments of the coding in block 620, the coding is performed by the coder/decoder (CODEC), 310A in FIG. 3A. In one embodiment of the coding in block 620, the coding is performed by the CODECs 415 and 416 in FIG. 4.

Method 600 also includes transforming the bit clock signal, the synchronization signal, and the data signal, into a digital audio signal, in block 630. In one embodiment of the transforming in block 630, the digital audio signal is synchronized by a series of synchronization bits. In one embodiment of the synchronization bits, the synchronization bits include a plurality of stop bits followed by a framing pulse. In one embodiment of the transforming in block 630, the transforming is performed by the field programmable gate array (FPGA), 340A in FIG. 3A, or FGPA 467 in FIG. 4.

Figure 7:
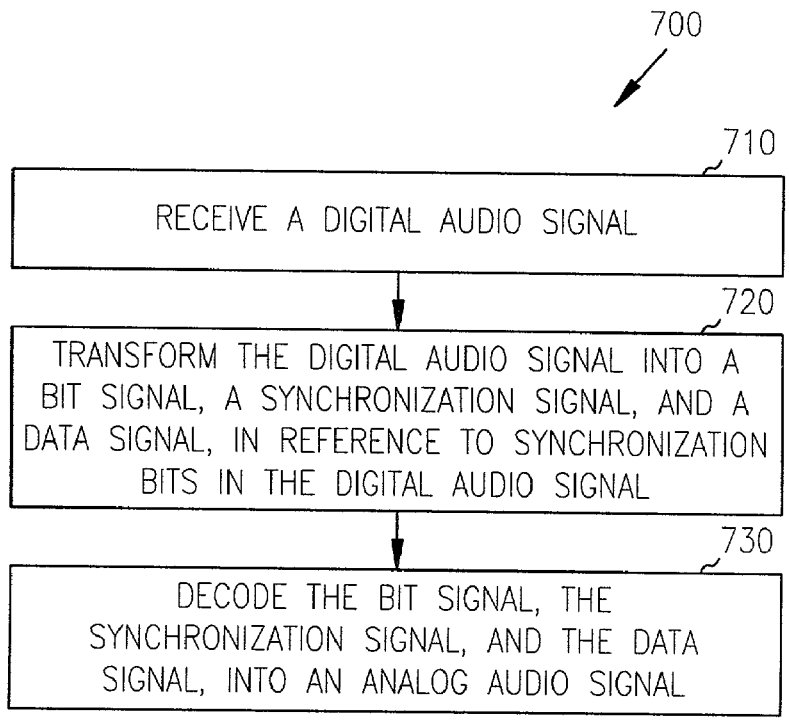
FIG. 7 is a flow diagram of a method of converting a digital audio signal into an analog audio signal, according to an embodiment of the present invention.

FIG. 7 is a flow diagram of a method 700 of converting the digital audio signal into a second analog audio signal, according to an embodiment of the present invention. Method 700 is one embodiment of converting the digital audio signal into a second analog audio signal, in block 550 in FIG. 5. In one embodiment, method 700 is performed by D/A converters 255 or 260 in FIG. 2.

According to teachings of the present invention, method 700 includes receiving the digital audio signal, in block 710. Method 700 also includes transforming the digital audio signal into a bit clock signal, a synchronization signal, and a data signal, in block 720. In one embodiment of the transforming in block 720, the transforming is performed in reference to a series of synchronization bits indicated in the digital audio signal. In one embodiment of the synchronization bits, the synchronization bits include a plurality of stop bits followed by a framing pulse. In one embodiment of the transforming in block 720, the transforming is performed by the field programmable gate array (FPGA) 340B in FIG. 3B. In one embodiment of the transforming in block 720, the transforming is performed by FGPA 466 in FIG. 4.

Method 700 also includes decoding the bit clock signal, the synchronization signal, and the data signal, into the second analog audio signal, in block 730. In one embodiment of the decoding in block 730, the decoding is performed by the coder/decoder (CODEC), 310B in FIG. 3B. In one embodiment of the decoding in block 730, the decoding is performed by CODECs 414 and 417 in FIG. 4.

One of ordinary skill in the art will readily appreciate that the methods in FIGS. 5–7 of the present invention can be performed using the systems and devices described above in connection with FIGS. 1, 2, 3A, 3B, and 4. The apparatus, systems and methods of FIGS. 1–7 offer an improved audio communication path between a first audio communication device, such as a communication panel, and a second audio communication device, such as a radio, in an aircraft avionic system which includes a digital communication path, which in turn, more accurately, efficiently, and understandably improves communication between audio devices in aircraft.

CONCLUSION

The above systems, devices and methods have been described, by way of example and not by way of limitation, with respect to communicating data between avionic audio communication devices.

A radio and a cockpit communication panel digitally communicate audio signals. Audio signals are transmitted as digital data between the communication panel and the radio. The communication panel and the radio function as both a receiver and a transmitter of digital audio signals. In one embodiment, in preparation for transmission by the master communication panel to the slave radio, an analog audio signal is received by the master communication panel and transformed by a coder/decoder (CODEC) into a plurality of signals; a bit clock signal, a synchronization signal, and a data signal. The plurality of signals is received and transformed by a field programmable gate array (FPGA) into a digital signal that includes framing pulse and stop bits. The digital signal is transmitted to and is received by the slave radio device. The digital signal is transformed by a FPGA in the receiving device into a second plurality of signals; a bit clock signal, a synchronization signal, and a data signal. A CODEC in the receiving device transforms the second plurality of signals into an analog audio signal. When the radio is the receiving device, the clock of the radio is synchronized in reference to the stop bits following the framing pulse in the digital signal.

The slave radio transmits signals to the master communication panel using simpler signal processing. A CODEC in the slave radio receives an analog signal and provides a data signal to a transmitter using a bit clock signal and a synchronization signal from the FPGA the slave radio. A digital data signal is transmitted from the slave radio to a receiver in the master communication channel. A CODEC receives the data signal from the receiver and transforms the signal into an analog signal using a bit clock signal and a synchronization signal from the FPGA in the master communication panel.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. An avionic apparatus comprising:
   a first communication device;
   a digital audio communication path operably coupled to the first communication device, the digital audio communication path including two unidirectional digital communication lines; and
   a second communication device, operably coupled to the first communication device through the digital audio communication path,
   wherein the first communication device and the second communication device are adapted to communicate a digital signal through the digital audio communication path that can be decoded into an analog signal without reference to a separate synchronizing clock signal communicated between the first communication device and the second communication device.

2. The avionic apparatus of claim 1, wherein the first communication device and the second communication device each include:
   an analog-to-digital converter, operably coupled to the digital audio communication path, and operably coupled to an analog audio communication path; and
   a digital-to-analog converter, operably coupled to the digital audio communication path, and operably coupled to an analog audio communication path,
   and wherein one of the analog-to-digital converters and one of the digital-to-analog converters includes:
      a coder/decoder, operably coupled to the analog communication path;
      a field programmable gate array, operably coupled to the coder/decoder through three communication paths; and
      a transmitter, operably coupled to the field programmable gate array through another communication path, and operably coupled to the digital audio communication path.

3. An avionic apparatus comprising:
   a first communication device;
   digital audio communication path operably coupled to the first communication device, the digital audio communication path including two unidirectional digital communication lines;
   a second communication device, co-located with the first communication device and operably coupled to the digital audio communication path; and
   wherein the first communication device and the second communication device each include:
      an analog-to-digital converter, operably coupled to the digital audio communication path, and operably coupled to an analog audio communication path,
      a digital-to-analog converter, operably coupled to the digital audio communication path, and operably coupled to an analog audio communication path, and
      wherein at least one of the converters includes—
         a coder/decoder, operably coupled to the analog communication path,
         a field programmable gate array, operably coupled to the coder/decoder through three communication paths, and
            a transmitter, operably coupled to the field programmable gate array through another communication path, and
            operably coupled to the digital audio communication path.

4. The apparatus of claim 3, wherein the first communication device includes a radio.

5. The apparatus of claim 4, wherein the radio includes a very-high frequency receiver/transmitter.

6. The apparatus of claim 3, wherein the second communication device includes a communication panel, having an operable interface capable of communicating an analog audio signal with a headset.

7. The apparatus of claim 3, wherein one of the analog-to-digital converters includes:
   a coder/decoder, operably coupled to the analog communication path;
   a field programmable gate array, operably coupled to the coder/decoder through three communication paths; and a transmitter, operably coupled to the field programmable gate array through another communication path, and operably coupled to the digital audio communication path.

8. The apparatus of claim 7, wherein the three communication paths include a first path that allows bit clock communication, a second path that allows synchronization communication, and a third path that allows data communication.

9. The apparatus of claim 3, wherein one of the digital-to-analog converters includes:
   a coder/decoder, operably coupled to the analog communication path;
   a field programmable gate array, operably coupled to the coder/decoder through three communication paths; and
   a transmitter, operably coupled to the field programmable gate array through another communication path, and operably coupled to the digital audio communication path.

10. An avionic device comprising:
    a radio;
    a communication panel, wherein the radio and the communication panel are operably coupled through a digital audio communication path,
    wherein the communication panel and the radio are adapted to communicate a digital signal that can be decoded into an analog signal without reference to a separate synchronizing clock signal between the communication panel and the radio, and
    wherein the radio and the communication panel each include:
        an analog-to-digital converter, operably coupled to a first unidirectional digital communication line in the digital audio communication path, and operably coupled to an analog audio communication path; and
        a digital-to-analog converter, operably coupled to a second unidirectional digital communication line in the digital audio communication path, and operably coupled to an analog audio communication path.

11. The device of claim 10, wherein one of the analog-to-digital converters includes:
    a coder/decoder, operably coupled to the analog communication path;
    a field programmable gate array, operably coupled to the coder/decoder through three communication paths; and
    a transmitter, operably coupled to the field programmable gate array through a communication path, and operably coupled to the digital audio communication path.

12. The device of claim 11, wherein the three communication paths include a first path that provides bit clock communication, a second path that provides synchronization communication, and a third path that provides data communication.

13. An avionic device comprising:
    a radio;
    a communication panel, wherein the radio and the communication panel are operably coupled through a digital audio communication path, the digital audio communication path including a first unidirectional digital communication line and a second unidirectional digital communication line; and
    wherein the radio and the communication panel each include:
        an analog-to-digital converter, operably coupled to the first unidirectional digital communication line in the digital audio communication path, and operably coupled to an analog audio communication path;
        a digital-to-analog converter, operably coupled to the second unidirectional digital communication line in the digital audio communication path, and operably coupled to an analog audio communication path; and
    wherein at least one of the converters includes:
        a coder/decoder, operably coupled to the analog communication path;
        a field programmable gate array, operably coupled to the coder/decoder through three communication paths; and
        a transmitter, operably coupled to the field programmable gate array through another communication path, and operably coupled to the digital audio communication path.

14. The device of claim 13, wherein one of the analog-to-digital converters includes:
    a coder/decoder, operably coupled to the analog communication path;
    a field programmable gate array, operably coupled to the coder/decoder through three communication paths;
    a transmitter, operably coupled to the field programmable gate array through a communication path, and operably coupled to the digital audio communication path.

15. The device of claim 14, wherein the three communication paths include a first path that provides bit clock communication, a second path that provides synchronization communication, and a third path that provides data communication.

* * * * *